June 19, 1962 W. L. IKARD 3,040,320
SEISMIC PROSPECTING APPARATUS AND METHOD
Filed April 12, 1957 4 Sheets-Sheet 1

Wallace Luther Ikard Inventor

By James A. Reilly Attorney

June 19, 1962  W. L. IKARD  3,040,320
SEISMIC PROSPECTING APPARATUS AND METHOD
Filed April 12, 1957  4 Sheets-Sheet 4

Wallace Luther Ikard  Inventor

By James G. Reilly  Attorney 3,040,320
SEISMIC PROSPECTING APPARATUS
AND METHOD
Wallace Luther Ikard, Tulsa, Okla., assignor, by mesne assignments, to Jersey Production Research Company
Filed Apr. 12, 1957, Ser. No. 652,414
15 Claims. (Cl. 346—1)

This invention broadly concerns an improved seismic method and apparatus for use in geophysical prospecting. More particularly, the invention relates to an apparatus and method for recording seismic signals of the type that are generated by seismic detectors or transducers in response to the reception of seismic waves. The invention especially concerns an improvement in the system of recording seismic signals in the form of variable density-type photographic traces.

The application of geophysical techniques in prospecting for subterranean deposits of minerals, gas, and petroleum is well known. Of particular interest and value is the reflection method of seismic prospecting which uses seismic impulses that are initiated in the vicinity of the surface of the earth. In essence, each such impulse generates an elastic wave of seismic frequency which is transmitted down through the earth. As the wave encounters discontinuities in the earth's structure such as strata of varying density, at least a portion of the energy in the wave is reflected and returned toward the surface of the earth. One or more seismic detectors positioned at the surface of the earth generate electrical signals in response to the reception of the returning wave energy. Depending upon the number of discontinuities in the earth's structure, each seismic detector generally receives a number of reflected waves varying both in magnitude and arrival time. Accordingly, the output of each seismic detector in a seismic observation is generally a sinusoidal-type electrical signal varying in amplitude with time, with prominent variations in the amplitude of the signal corresponding to the arrival of reflected waves.

By marking the time at which a seismic impulse is initiated, and by subsequently measuring the elapsed time for seismic waves to be reflected to one or more seismic detectors from subsurface discontinuities, it is possible to determine the nature and depths of the discontinuities themselves. To make these determinations, a seismograph is generally used in each seismic observation to record the time of the seismic impulse, as well as the times of the seismic signals that are transmitted by the seismic detectors which are spaced at known distances from the impulse.

Generally speaking, the "seismic signal" generated by each detector or group of detectors in a seismic observation is recorded in the form of a separate trace on a seismogram. In other words, each trace on a seismogram is a record with time of the variations in the output of the detector associated with the trace.

Originally, seismogram traces were usually oscillographic-type traces formed by the action of a recording pen or of a beam of light on suitable recording paper or photographic film. More recently, however, it has become an increasing practice to record seismic detector signals in the form of reproducible traces such as variable density or variable area photographic traces, magnetic traces, and the like.

Reproducible traces have become especially desirable, since equipment and methods are now available for automatically reproducing, correcting, and re-recording such traces in the form of seismic sections. Indeed, seismograms containing reproducible trace information possess so many desirable features that it has now been found advantageous to convert visual, non-reproducible, oscillographic-type trace seismic records into the reproducible type.

The general technique of recording seismic signals in the form of reproducible traces has been described in United States 2,051,153, Rieber. Several types of reproducible traces are described there, and particular emphasis is given to the variable density photographic trace. This type of trace is formed in general by scanning a photographic recording medium with a beam of light while simultaneously varying the intensity of the beam in response to the variations in a seismic signal. The intensity of the beam is varied in general: (1) by varying the intensity of the light source of (2) by varying the position of a variable density filter or optical wedge in the path of a constant intensity beam.

Since a variable density trace recording of a seismic signal is obtained in effect by varying the exposure of a photographic recording medium along its length, it will be recognized that variations in the relative velocity between the recording medium and the light beam exposing the medium may have a serious effect upon the fidelity of the information recorded. This is true whether the seismic signal is an "original signal" recorded directly from a seismic detector, or whether it is a "reproduced signal" obtained by "playing back" and re-recording previously recorded information. Generally speaking, the problem is not a very serious one in recording "original signals" or in recording "reproduced signals" obtained by playing back reproducible seismograms, since equipment and methods for processing such signals may be made substantially constant in speed. The problem, however, can be quite severe in re-recording seismic signals that are obtained by translating visible, non-reproducible oscillographic trace seismograms into variable density seismograms. Oscillographic traces are sinusoidal in appearance, and they frequently overlap one another with the result that methods and apparatus for "reproducing" such traces can not conveniently be made to be constant in their rate of scan along the traces. Thus, it generally takes much more time and care to scan along an involved portion of an oscillographic trace than it does along a relatively simple portion of a trace. Indeed, it is frequently advantageous to take more time with complex portions of such traces, since these portions are frequently the portions of real interest in the trace. At this point, it should be noted that apparatus and methods have now been developed for "reproducing" otherwise non-reproducible oscillographic-type traces; and a typical method and apparatus will be briefly described later hereinafter in discussing the present invention. The typical method and apparatus, in this instance, is set forth and claimed in U.S. Patent application Serial No. 577,175, filed April 9, 1956, in the names of J. M. Horeth, J. D. Skelton and W. J. Stark, now abandoned.

Accordingly, it is a general object of this invention to provide a system of recording a seismic signal in variable density form wherein the adverse effects caused by variations in the speed or velocity of the recording medium past the recording light beam (or vice versa) are reduced. It is a more specific object of the invention to provide an improved method and apparatus for translating a visible, oscillographic-type seismic trace into a variable density photographic trace. More particularly, it is an object of the invention in such a method and apparatus to enable an oscillographic trace to be scanned at different rates along its length without causing varying exposures to occur in the corresponding variable density photographic trace as a result of such speed variations.

These and related objects of the invention, which will be expressly discussed or readily apparent in the description that follows, are attained by pulsing the light beam which exposes a photographic recording medium in a variable density recording system. At this point, it will be recalled that a variable density trace record of a seismic signal is conventionally made by effecting relative movement between a light beam and a photographic recording medium and by modulating the intensity of the beam in response to variations in the seismic signal. The present invention improves upon this system by avoiding continuous contact between the light beam and the recording medium throughout the length of the variable density trace. Instead, the light beam is "pulsed" in that it is impinged upon the recording medium a predetermined number of times for every unit length of the medium. The energy in each impinged pulse is determined only by the magnitude of the seismic signal at that instant.

The pulsing may be achieved, for example, by either pulsing the light source itself or by interrupting the beam as by means of an opaque object. If it is assumed that the light beam is to be pulled N times per unit length of linear measure along the length of the trace, then the length of each individual exposed segment or image on the recording medium should be at least 1/N times the unit of linear measure itself. In this connection, it is assumed that the length of each such segment or image is the dimension of the segment which extends in the same direction as the length of the trace. This relationship between pulsing frequency and the dimensions of the images formed on the variable density trace should be observed in order to provide a trace which is continuous in appearance and not marked by unexposed areas between the individual pulse images.

As just noted, a variable density trace such as is formed in accordance with this invention is not strictly speaking a continuous trace. Instead, it is composed of a plurality of images or recordations disposed along the trace. The number of images or recordations is equal for each unit length of the trace. Although the images may be slightly spaced from one another, it is preferred that they abut or overlap one another so as to provide the trace with a substantially continuous appearance. The resulting trace thereby resembles a conventional variable density trace.

The number of pulses of light per unit length of recording medium in the present invention may be varied substantially. One should, however, use a sufficient number of pulses to result in sampling each cycle of each signal component of interest in a seismic signal at least five times and preferably at least ten times. The spacing of the cycles on the seismogram will, of course, depend upon the frequency of the signal and the speed of recording. At this point, it is well to note that signal frequencies up to 100 c.p.s. and sometimes 150 c.p.s. are generally of interest in seismic work.

The physical dimensions of the images that are recorded on the photographic recording medium likewise may vary substantially without affecting the quality of the results. It is apparent, of course, that the images should have a width which is equal to the width of the desired trace; and, as indicated above, each image should have a length at least equal to 1/Nth of the unit length of the trace where N pulses of light per unit length are employed. When using a 1/N unit length of the image, a variable density trace is formed in which the individual images abut one another and thereby form a substantially continuous-type trace. It will be apparent, however, that such a relationship requires a substantially perfect optical system and a photographic recording medium that has a virtually linear response to light in order to avoid obvious delineations between the images. Since such conditions are difficult in practice to achieve, it is preferred to use images that are at least several times as long as images which would merely abut one another. For example, in a system employing 1000 pulses of light per inch of length along a photographic recording medium, it has been observed that an image about 0.020 to 0.030 inch long provides very desirable results. It will be recognized, of course, that, in a system employing 1000 pulses per inch of trace, the individual pulses must form an image 0.001 inch long to provide a trace in which the images merely abut one another.

To recapitulate briefly, then, the present invention concerns a variable density recording system in which a photographic recording medium is subjected to repeated exposure by a variable intensity light beam while relative movement between the light beam and recording medium is being effected. Each point along the length of each variable density trace is subjected to a substantially constant number of exposures regardless of the relative speed between the medium and the light beam. The seismic signal which modulates the intensity of the light beam now in effect modulates the energy in each pulse of light. Each trace that is formed is therefore still variable density in character and exhibits variations in photographic intensity along its length which correspond to amplitude variations in the modulating signal.

The amount of energy in the light pulses of this invention may be controlled either by maintaining the duration of each pulse at a constant value and varying the energy levels of the pulses, or by varying the duration of the pulses and maintaining the energy level in each pulse at a constant value. It will be recognized, of course, that combinations of these two general procedures may also be used when so desired.

As noted earlier in this description, the present invention is particularly adapted to the transcription or translation of visible oscillographic-type seismic traces into variable density photographic traces. Although a visible oscillographic-type trace is not reproducible in the same sense as a magnetic or photographic trace, it is nevertheless now possible to generate a seismic signal which corresponds in its characteristics to a seismic signal previously recorded as an oscillographic trace. Thus, as shown in the Horeth et al. patent application, supra, it is possible to cause a stylus or equivalent pointer to follow along an oscillographic trace and by lateral and longitudinal displacements of the stylus to generate a train of electrical signals which is related to the oscillations in the trace.

The invention may be better understood by reference to the attached drawing which illustrates a preferred embodiment of the invention as well as the best mode contemplated for carrying out the invention.

Figure 1:
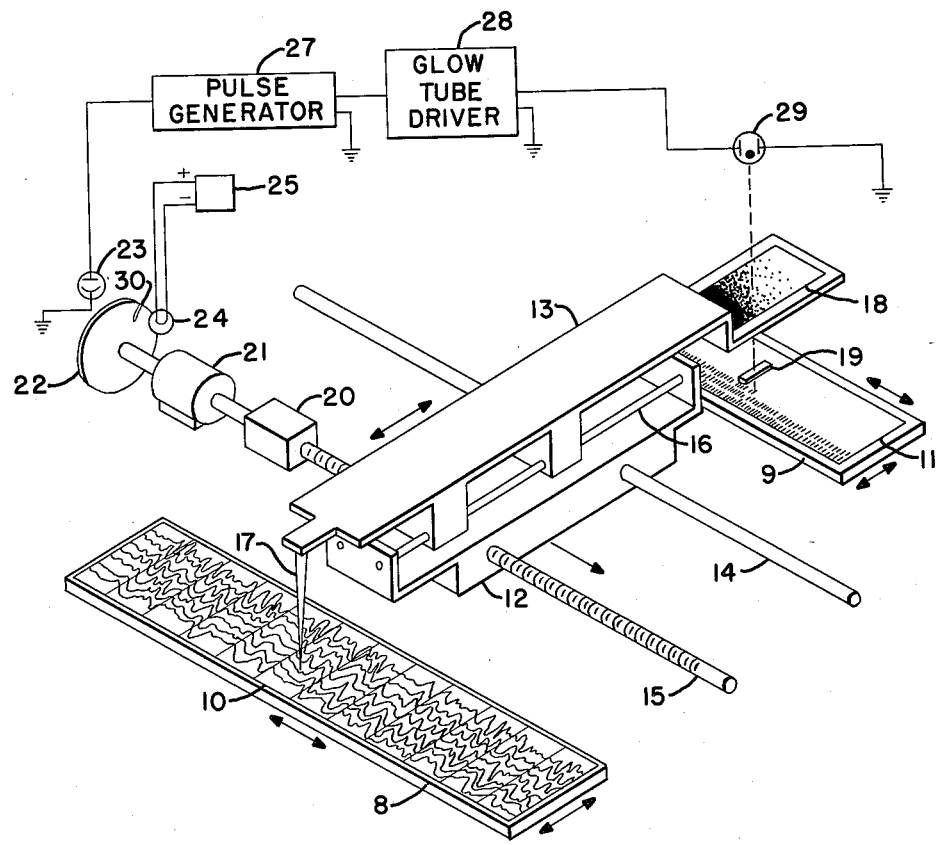
FIGURE 1 is a schematic view of an apparatus embodying the principles of the invention which is adapted to translate or transcribe oscillographic traces on a seismic record into variable density traces.

Turning first to FIGURE 1 of the drawing, there are illustrated a seismic record 10 consisting of a plurality of oscillographic traces; a photographic recording medium 11; lower carriage 12; upper carriage 13; longitudinal carriage bar 14; lead screw 15; transverse carriage bars 16; stylus 17; a variable density light filter 18; and cylindrical lens 19. Also illustrated are gear reducer 20, variable speed motor 21, notched disc or wheel 22, photocell 23, light source 24, power source 25, pulse generator 27, glow tube driver 28, and glow modulator tube 29.

As indicated in FIGURE 1, lower carriage 12 is mounted upon lead screw 15 and longitudinal carriage rod 14. Transverse carriage bars 16 are, in turn, supported by lower carriage 12; and they, in turn, support the upper carriage 13. Upper carriage 13 is slideable along the length of the upper carriage bars 16 and has stylus 17 at one end mounted above the seismogram 10. Mounted at the other end of the upper carriage and immediately above the recording medium 11 is the variable density light filter 18. Filter 18 is preferably a photographic plate which has been exposed in such a way that the image on the plate increases in optical density from one lateral edge of the plate to the opposite lateral edge. It is assumed for the purpose of the explanation that the length dimension of the variable density filter 18 lies in the same direction as the length of the traces on the recording medium 11.

Glow modulator tube 29 and cylindrical lens 19 are both supported by means not shown from the lower carriage 12 and in vertical alignment with one another. Thus, light from the tube 29 is transmitted through the filter 18 and impinged upon lens 19; and the lens 19, in turn, focuses the light as a line-shaped beam upon the photographic medium 11. The length of the line-shaped image on the photographic medium 11 will be considered to be normal or perpendicular to the length of the traces formed thereon.

To summarize momentarily, then, it will be recognized that, as stylus 17 is moved along the length of the seismogram 10, the glow tube 29, the filter 18, and the cylindrical lens 19 are similarly moved along the length of the photographic recording medium 11. Similarly, as stylus 17 is laterally displaced from the longitudinal axis or center line of a trace on the seismogram 10, the filter 18 moves laterally relative to the length of the traces on the photographic medium 11. It will be noted that glow modulator tube 29 and lens 19, being supported from the lower carriage member 12, do not follow lateral movements of the upper carriage member 13. Thus, as stylus 17 departs from the effective center line (i.e., the neutral point) of a trace on seismogram 10 as in following a recorded reflection event, the light beam impinging upon the photographic medium 11 varies in its intensity. In other words, the portion of the light output of tube 29 that reaches the recording medium 11 varies with the lateral position of the stylus 17.

It should also be noted at this point that seismogram 10 and photographic medium 11 are preferably mounted on suitable supports 8 and 9, respectively, which are capable of longitudinal as well as transverse motion relative to the traces on the seismogram and the record medium. It will be recognized that independent adjustment of the seismogram 10 and recording medium 11 by movement of their respective supports is desirable from the standpoint of properly aligning the traces to be transcribed. A detailed illustration of suitable supporting means for the seismogram and the record medium have not been included in the figure in order to keep it as simple as possible. The nature of suitable supporting means, however, will be readily apparent to persons skilled in the art; and it is therefore not considered necessary to include such information in this drawing.

While it is possible to provide means for enabling stylus 17 to automatically follow along a trace on the seismogram 10, it will be assumed in the present description that stylus 17 is actuated in its lateral movements by manual means.

Longitudinal movement of stylus 17 along the length of the traces on the seismogram 10 is obtained by means of the motor 21 which drives the lead screw 15, preferably through reduction gear unit 20. Lead screw 15 may be a self-reversing type resembling, for example, the self-reversing screws that are used in fishing reels. Then, when lower carriage 12 reaches one end of the lead screw, it may reverse automatically and return to the opposite end of the screw. Limit switches may be provided at each end of the lead screw 15 or carriage rod 14 to more positively limit the movement of the carriage member 12 along the seismogram 10. The limit switches may also be reversing switches adapted to reverse the action of the motor 21 or the reduction gear 20 so as to automatically reverse the movement of the carriage 12 when it has reached one limiting position on the lead screw 15.

Drive motor 21 is preferably a variable speed motor operated for example by means of a foot treadle in the same manner as a sewing machine motor. As explained earlier, a variable speed drive is desirable in the apparatus of FIGURE 1, since it enables an operator to scan complex portions of a seismogram 10 at slower speeds than he scans simple portions of the seismogram.

Also driven by motor 21 is disc 22 which has a slot 30 on its periphery. Disposed on opposite sides of the slot 30 is a light source 24 and a photoelectric cell 23. The disc, the light source, and the photoelectric cell are aligned so that light is transmitted to the photoelectric cell once during every revolution of the disc 22. The light source 24 may receive its power from any convenient source 25.

At this point, it will be recognized that photoelectric cell 23 receives a fixed number of pulses from the light source 24 for every unit of linear measure along the film 11 that the glow tube 29 travels. The actual number of pulses is determined by such factors as the pitch characteristics of the lead screw 15 as well as the rotational speed of the screw relative to the rotational speed of the disc 22.

As indicated in the figure, glow tube 29 is powered by the glow tube driver 28 which is energized by the pulse generator 27. Generator 27, in turn, is triggered by a pulse of energy generated by the photoelectric cell 23 whenever light from source 24 strikes the cell. In short, glow tube 29 transmits a beam of light through the filter 18 and the lens 19 to the recording medium 11 every time that the photocell 23 is energized.

To recapitulate briefly, it is apparent that the spacing of pulses along the medium 11 is substantially independent of the rate at which the stylus 17 travels along the seismogram 10. Furthermore, as will be explained hereinafter, the amount of energy transmitted by the glow tube driver 28 to the glow tube 29 during each pulse is also substantially independent of the speed of the stylus 17. Expressed otherwise, the apparatus of FIGURE 1 is one in which an equal number of light pulses containing an equal amount of energy are delivered by glow tube 29 for every linear unit of distance along the medium. Therefore, the amount of exposure of the recording medium depends only on the position of the filter 18.

Figure 2:
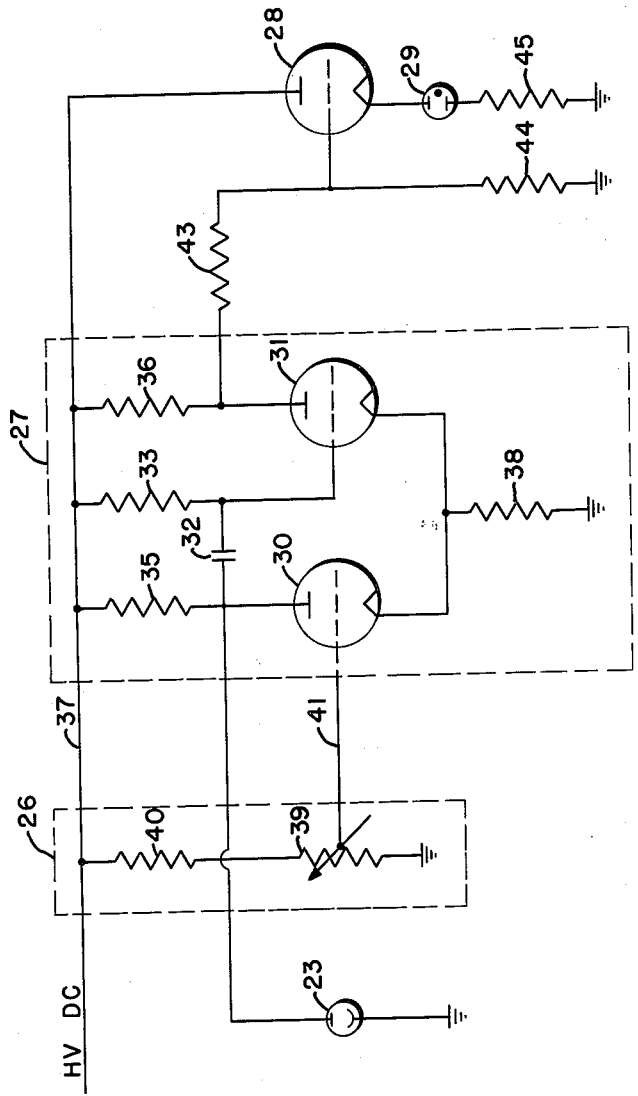
FIGURE 2 is a schematic wiring diagram of a particularly preferred type of modulation input and modulator assembly for use in the apparatus of FIGURE 1.

A preferred type of electrical circuit for use as the pulse generator 27 of FIGURE 1 is shown in FIGURE 2. Both of these figures use identical legends for identical components. Thus, the photoelectric cell 23, the pulse generator 27, the glow tube driver 28, and the glow tube 29 of FIGURE 1 are all identified by the same legends in FIGURE 2.

Referring now to FIGURE 2, pulse generator 27 is shown to be in essence a one-shot multivibrator comprising two triodes 30 and 31. The plate circuit of triode 30 is RC-coupled by means of capacitor 32 and resistor 33 to the grid circuit of triode 31. The plates of both triodes are connected through proper impedances 35 and 36, respectively, to a high-voltage D.C. source 37. The cathodes of the triodes are connected through a common resistor 38 to ground. Triode 31 acts, therefore, like a cathode follower; and changes in its grid voltage have an effect on the grid-to-cathode voltage of triode 30.

The grid of triode 30 is connected through resistors 39 and 40 to ground and to the high-voltage D.C. source, respectively. As indicated, resistor 39 is preferably a variable resistor; and the values of both resistors are preselected so as to keep the voltage of the grid at a low value relative to the cathode. In other words, the cathode of triode 30 is normally kept sufficiently positive with respect to its grid so as to render this triode normally nonconductive.

Figure 3:
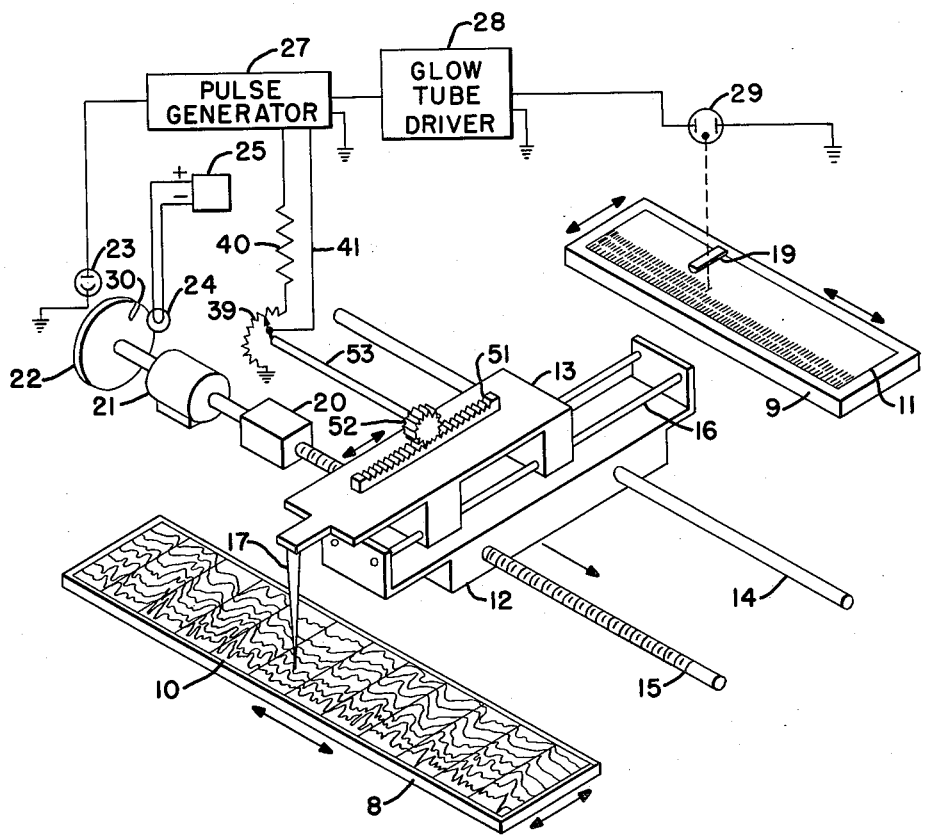
FIGURE 3 is a schematic view of another apparatus embodiment of the invention.

As shown in FIGURE 2, resistors 39 and 40 combine to form a member 26 which will hereinafter be referred to as a modulation input for the pulse generator 27. The modulation effect of this particular member is not particularly important to the apparatus shown in FIGURE 1; but it becomes quite important in considering the embodiment that is illustrated in FIGURE 3. In the latter apparatus, the modulation input 26 is used in place of the variable density filter of FIGURE 1 to modulate the energy contained in the pulses of light that are transmitted to the recording medium 11.

Photoelectric cell 23 is connected to the plate of triode 30 and transmits negative signals to the plate upon being energized. Capacitor 32 should be of a value such that a drop in the plate voltage of triode 30, as caused by the reception of an impulse from cell 23, does not appreciably alter the charge on the capacitor during the duration of the impulse. Resistor 33 should also be of a high value relative to resistor 35 so that the time constant requirements do not dictate the use of a large capacitor 32. In other words, the reset switching time should be short with respect to the pulsing rate period.

The plate of triode 31 is connected to the high-voltage D.C. source 37 through impedance 36 and to ground through resistors 43 and 44. The latter resistors are selected so as to normally maintain the grid of triode 28 at a low enough level relative to ground to prevent firing or conduction of glow modulator tube 29. The cathode is connected to glow tube 29, and this tube is in turn connected through resistor 45 to ground.

Having outlined the elements shown in FIGURE 2, their manner of operation is set forth below. First, in the absence of an impulse from photocell 23, triode 30 is normally non-conductive and triode 31 normally conductive. Triode 28, which is also the glow tube driver, is non-conductive; and the glow tube 29 is not lighted.

Upon receiving a negative pulse from cell 23, the plate voltage of triode 30 is rendered less positive; and the grid of triode 31 is similarly rendered less positive relative to its cathode. As a result, the voltage drop across resistor 38 is decreased; and the cathode of triode 30 is rendered that much less positive relative to its grid. When the voltage differential between the grid and the cathode becomes small enough, the triode becomes conductive and its plate voltage becomes rapidly less positive. Triode 31 is driven to cut off with the result that its plate becomes more positive. The grid of triode 28 also becomes sufficiently positive relative to its cathode to render this triode conductive and thereby fire tube 29.

At the point when triode 30 is rendered non-conducting and triode 31 conducting, capacitor 32 commences discharging through resistor 33 to the high-voltage D.C. source 37 until the grid voltage on triode 31 becomes sufficiently positive to render this triode conducting again. Capacitor 32 is then recharged through the grid-cathode circuit of triode 31; triodes 30 and 28 again become non-conductive; and tube 29 is extinguished.

The duration of the pulses that are generated by the generator 27 may be readily adjusted by means of the variable resistor 39. For example, the resistance-to-ground of the grid of triode 30 may be increased by adjustment of the resistor 39 thereby causing the grid to become correspondingly more positive toward its cathode. Trigger pulses from photocell 23 under these circumstances cause the triode 30 to conduct more in the periods immediately following the triggers than would otherwise be the case. Because of this condition, capacitor 32 must charge back through a slightly larger voltage change before triode 31 is rendered conductive again—thus leaving this triode non-conductive for longer time periods than would otherwise be the case. The pulses transmitted to the grid of triode 28 during the non-conductive periods of triode 31 therefore become longer in their duration. In a similar manner, these pulses may be made shorter in their duration by merely decreasing rather than increasing the value of the resistance-to-ground of the grid of triode 30—again by adjusting the resistor 39.

Returning now to FIGURE 1, the apparatus shown there may be operated as follows. First, a seismogram of a visual oscillographic type is placed on support 8, and a photographic recording medium such as photo-sensitive film is placed on support 9. The supports are then adjusted so as to have the stylus 17 and the light projection assembly consisting of tube 29, variable density filter 18, and lens 19 properly aligned relative to the seismogram and the recording medium, respectively. The stylus, for example, is centered over and at one end of a trace on the seismogram; and the projection assembly is similarly placed at a predetermined point over the recording medium.

Longitudinal movement of stylus 17 along seismogram 10 is realized by starting motor 21. This motor drives lead screw 15 through gear box 20, and the lead screw in turn drives the lower carriage 12. It will be noted that lower carriage 12 is provided internally with threads which engage the threads of the lead screw so that rotation of the screw causes the carriage member to advance along the length of the screw. It will also be noted that clutches or the like may be inserted in the power train between the motor 21 and the lead screw to facilitate starting and stopping of the stylus 17.

The stylus 17 is moved along the length of a trace of seismogram 10 by means of motor 21 at a rate controlled by the operator. The operator similarly controls lateral movements of the stylus to follow amplitude variations in the trace—in this case by a single manual procedure. When the stylus has negotiated the length of each trace, its direction of travel is reversed and it is returned to the opposite end of the seismogram 10. At this point, the support members 8 and 9 are moved as desired so as to enable the operator to transcribe another trace from the seismogram to the recording medium 11. The scanning operation is then repeated for this new trace, and the entire sequence is repeated until all of the traces have been scanned.

It should be noted at this point that the apparatus in FIGURE 1 may be readily modified so as to automatically incorporate static and dynamic seismic corrections within each trace as it is transcribed and re-recorded on the recording medium. For example, static (i.e., fixed) corrections may be readily made by simply displacing the traces longitudinally as necessary to incorporate time errors occasioned by the low-velocity layer, the elevations of the seismic impulse point and detector points relative to a predetermined datum level, etc. Dynamic corrections (i.e., spread and other variable corrections) may be incorporated within each trace by continuously displacing each trace longitudinally predetermined amounts as the stylus scans along the trace. A number of analog devices are presently available which may be readily incorporated within the illustrated apparatus to serve both of these functions. One such analog device is shown in the Horeth et al. patent application, supra.

As stylus 17 travels longitudinally along each trace on the seismogram 10, the glow tube 29, the filter 18, and the lens 19 similarly travel along the recording medium 11. In addition, filter 18 moves laterally relative to the traces recorded on the record medium in response to lateral movements of the stylus 17. Thus, portions of the filter having different light transmission characteristics are continuously brought within the beam of light that is focused upon the medium. The medium, therefore, experiences varying degrees of exposure, and the traces recorded thereon are variable in density along their length. As with the seismogram 10, the record medium 11 and its support 9 are adjusted relative to the light projection assembly between the recording of successive traces.

Simultaneously with the movement of the stylus 17, disc 22 rotates on its shaft and repeatedly exposes photocell 23 to light source 24. As a result, a series of pulses of electrical energy is transmitted to the plate of the triode 30 (see FIGURE 2) of the pulse generator 27. With the reception of each such pulse by the triode 30, the glow tube 29 is illuminated as has been described previously in connection with the discussion of FIGURE 2. As a result, a series of images—rather than one continuous image—is recorded on the record medium 11. The duration of the pulses, as explained earlier, is controlled and adjusted by means of the variable resistor 39 in the modulation input circuit 26.

In accordance with the system just described, the glow modulator tube 29 is repeatedly energized by receiving substantially identical pulses of electrical energy from pulse generator 27. In other words, the glow modulator tube is always maintained at substantially the same energy level during each pulsation, and substantially the same quantity of energy is therefore radiated during each pulse to the record medium 11. The quantity of light energy that actually impinges upon the recording medium 11, however, is further controlled by the variable density filter 18. The position of the filter, as explained earlier, continuously follows lateral movements of the stylus 17.

As indicated earlier in this description, a variable film exposure for producing variable density records may be obtained by employing variable time duration of a fixed-intensity pulsed light source rather than a variable density filter. A system of this type is shown in FIGURE 3. Examination of this figure reveals that the apparatus shown therein is essentially a modification of the apparatus illustrated in FIGURES 1 and 2. The apparatus in FIGURE 3 lacks the variable density filter 18 of FIGURE 1, but it includes a rack and pinion assembly consisting of rack 51 and pinion 52 which are lacking in the apparatus of FIGURE 1. The rack 51 is mounted on the upper carriage member 13; and the pinion gear 52 and its shaft 53 are supported so that lateral movement of upper carriage 13 causes the pinion to move relative to the rack. This movement in turn causes the movable contact of the variable resistor 39 to move along the resistor.

As explained earlier in this description, changes in the position of the contact arm of resistor 39 causes changes in the duration of the pulses that are formed by the pulse generator 27. Changes in the duration of pulses, in turn, cause changes in the amount of the light which is emitted by the glow tube 29. The traces that are formed by the glow tube 29 on the recording medium 11 are therefore variable in density in a manner corresponding to lateral oscillations of the traces on the seismogram 10. It will be recognized, of course, that glow tube 29 and lens 19 are integrally connected and that these members move along the recording medium 11 in synchronism with movement of stylus 17 along the seismogram 10. The necessary structure for interconnecting the glow tube and lens with the stylus are not shown in FIGURE 3 for the reason that such information is considered unnecessary for a complete understanding of the invention. Furthermore, the nature of such structure will be readily apparent to persons skilled in the art.

While the apparatus illustrated in the drawing and described hereinbefore constitute preferred embodiments of the present invention, it will be appreciated that numerous modifications and variations of the invention are possible. For example, it is within the scope of the invention to incorporate the principles of the invention within apparatus and methods for recording seismic signals that are generated directly within the field by seismic detectors. It is also within the scope of the invention to use filters, amplifiers, and the like such as are conventionally employed in processing seismic information.

In an arrangement similar to FIGURE 3, resistor 45 may be made variable instead of resistor 39. The light source would then be variable in intensity to obtain a variable density effect.

Referring specifically to FIGURE 1, it will be recognized that devices other than the slotted disc and photocell assembly may be used to transmit pulses to the modulator 27. For example, the shaft of motor 21 may be adapted to close a simple switch once during every revolution, thereby delivering an electric impulse from a suitable power source to the modulator. Again, it is possible—but less referred—to use drum elements to support the seismogram 10 and the record medium 11 instead of the flat members 8 and 9, respectively. It will also be recognized that any one of several types of light-tight enclosures may be constructed around the medium 11 and the light projection assembly so as to prevent undesirable exposure of the record medium.

Turning next to FIGURE 2, it will be recognized that positive pulses from photocell 23 may be used as desired, but in this instance the pulses must be applied to the grid of triode 30. Again, triodes 30 and 31 may be incorporated in a single envelope in the form of a dual triode when so desired. Also, other amplifying-type electron tubes such as tetrodes and pentodes may be readily adapted to the circuitry and purposes of the invention. Semiconductor devices such as diodes, transistors, fieldistors, etc., may also be employed.

It will also be recognized that the stylus 17 need not be directly connected to the variable density recording system as shown in FIGURES 1 and 3. Thus, it will be apparent that selsyn mechanisms may be used which enable the stylus and the variable density light projection system to operate in a synchronized but not identical manner. It is then possible to prepare a variable density section on the recording medium 11 which is scaled up or down from the information on the seismogram 10.

Figure 4:
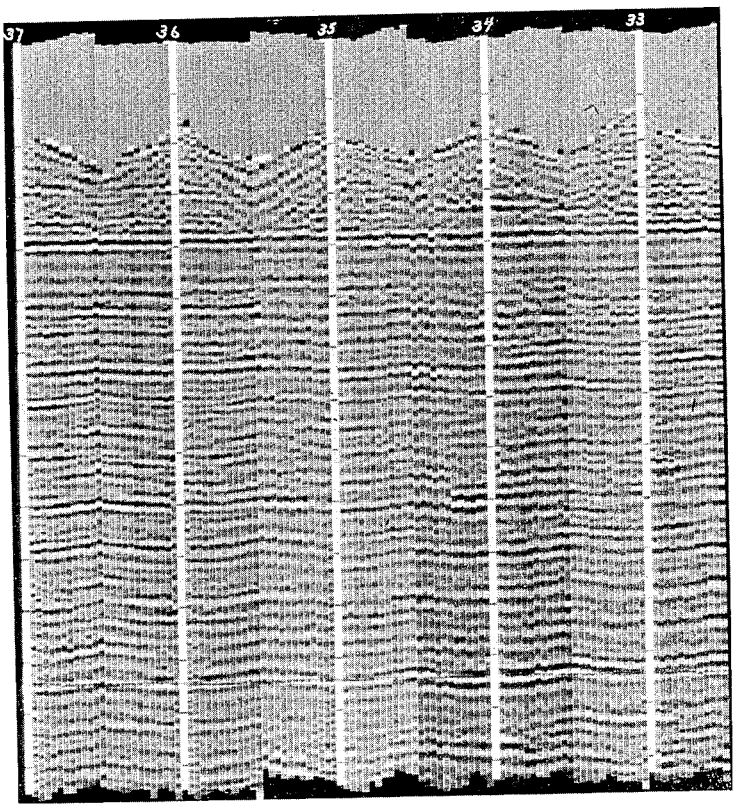
FIGURE 4 illustrates a variable-density seismic section prepared using the present invention.

Referring to FIGURE 4, the individual variable-density traces of the section shown there were recorded using the present invention. In this instance, the individual traces were recorded using some 880 pulses of light per linear inch of travel along the traces. The individual pulses had a dimension of 1/32 inch in the direction of travel, so that successive images overlapped one another many times.

The system of this invention is also easily adapted to produce seismic sections other than the variable density type. For example, variable color sections may be obtained by merely substituting a variable color filter for the variable density filter in FIGURE 1 and by using color film instead of black and white film as the recording medium.

What is claimed is:

1. An apparatus for recording a seismic signal which comprises a photographic recording medium, a light source adapted to direct a beam of light upon said medium and to form an image thereon, means to effect relative linear movement between said beam and said medium, pulsing means to pulse said light beam a constant and sufficient number of times per unit length of said movement such that the successive images created thereby on the recording medium at least abut one another, and modulation means responsive to amplitude variations in the seismic signal to modulate the energy contained in the pulses of light.

2. An apparatus as defined in claim 1 in which the modulation means comprises a variable density filter movably positioned in the light beam between the light source and the recording medium.

3. An apparatus as defined in claim 1 in which the modulation means comprises means cooperative with said pulsing means to pulse the light source for variable lengths of time.

4. An apparatus as defined in claim 1 in which the pulsing means pulses the light beam a constant and sufficient number of times per unit of length of said relative movement to overlap at least several images on the recording medium.

5. In a method of recording a seismic signal as a variable-density photographic trace by effecting relative movement between a photographic recording medium and a light source adapted to impinge a beam of light upon the medium, the improvement which comprises pulsing the beam of light upon the medium an equal and sufficient number of times for each equal interval of said relative movement such that the images formed thereby on said medium at least abut one another in the direction of said movement, regulating the duration of the pulses independently of said movement, and modulating the light energy in each pulse in response to variations in said signal.

6. A method as defined in claim 5 in which the number of the pulses for each equal interval of said relative movement is sufficient to cause successive images on the photographic medium to overlap.

7. A method as defined in claim 5 in which the pulses are duration-modulated.

8. A method as defined in claim 5 in which the pulses are intensity-modulated.

9. In a method of recording a seismic signal as a variable-density photographic trace by effecting relative movement between the length of said medium and a beam of light arranged to form an image thereon having a length dimension in the direction of said movement, the improvement which comprises pulsing the light beam in response to said movement a constant number of times for each unit distance of said movement, coordinating the length dimension of the images with the frequency of the pulses such that succeeding images overlap one another along said medium, regulating the duration of the pulses independent of said relative movement, and modulating the energy of each pulse in response to amplitude variations in said signal.

10. A method as defined in claim 9 in which the frequency of the pulses is at least five times that of the highest frequency component of interest in the seismic signal.

11. A method as defined in claim 9 in which the frequency of the pulses is about 1000 pulses per inch of relative movement, and the images formed thereby have a length of about 0.20 to 0.30 inch.

12. In a method of recording a seismic signal as a variable-density photographic trace by impinging a beam of light upon a photographic recording medium to form an image thereon and effecting relative movement between said beam and said medium, the improvement which comprises pulsing the beam of light a constant number of times for each unit length of said relative movement and in response to said movement, modulating the amount of light energy in each pulse in response to variations in the amplitude of said signal, regulating the dimension of each image in the direction of said movement at least equal to 1/N times said unit length where N equals the number of pulses per unit length of movement, controlling the duration of said pulses independent of said movement, the frequency of said pulses being at least five times the frequency of the highest frequency component of interest in the seismic signal.

13. In a system of recording a seismic signal which includes a light source adapted to direct a beam of light against a photographic medium so as to form an image thereon together with means for effecting linear relative movement between the light source and the medium so as to generate a photographic trace along the medium, the improvement which comprises means responsive to said relative movement for pulsing the light source a predetermined equal number of times for each linear unit of said movement, means to control the duration of the pulses independently of said movement, such that the images formed on said medium by successive pulses partially overlap one another and means to modulate the quantity of light received by the medium during each pulse in response to variations in the seismic signal.

14. In an apparatus for recording a seismic signal as a variable-density photographic trace which includes a light source and a photographic recording medium in movable relation therewith, the improvement which comprises: means responsive to said movement to energize said light source a constant number of times N for each unit length of said movement, means to control the duration of each energization of said light source, means for shaping each image formed by the light on said medium to have a dimension in the direction of said movement at least 1/N times the unit length of movement, and modulation means responsive to variations in the magnitude of said signal to modulate the energy received by the recording medium during each energization of said light source.

15. An apparatus as defined in claim 14 in which the modulation means is of a character to modulate the duration of each energization.

References Cited in the file of this patent

UNITED STATES PATENTS

| | | |
|---|---|---|
| 1,910,995 | Leventhal | May 23, 1933 |
| 2,415,879 | Hassler | Feb. 18, 1947 |
| 2,415,880 | Hassler | Feb. 18, 1947 |
| 2,604,955 | Hawkins | July 29, 1952 |
| 2,712,694 | Herbold | July 12, 1955 |
| 2,769,683 | Skelton | Nov. 6, 1956 |
| 2,791,288 | Meier | May 7, 1957 |